United States Patent
Strüssmann

[19]

[11] Patent Number: 5,891,484
[45] Date of Patent: Apr. 6, 1999

[54] DEVICE FOR MANUFACTURING SANDALS

[75] Inventor: Rolf Strüssmann, Blender, Germany

[73] Assignee: Klöckner Desma Schuhmaschinen GmbH, Achim, Germany

[21] Appl. No.: 975,840

[22] Filed: Nov. 21, 1997

[30] Foreign Application Priority Data

Dec. 21, 1996 [DE] Germany .................. 195 53 849.1

[51] Int. Cl.⁶ .................................................. B29D 31/50
[52] U.S. Cl. ................ 425/119; 425/129.2; 425/DIG. 44
[58] Field of Search ................................. 425/119, 129.2, 425/DIG. 44

[56] References Cited

U.S. PATENT DOCUMENTS

| | | | |
|---|---|---|---|
| 1,770,655 | 7/1930 | Nielsen | 425/119 |
| 1,842,719 | 1/1932 | Dunker | 425/119 |
| 1,995,429 | 3/1935 | Laura | 425/119 |
| 2,569,725 | 10/1951 | Masek | 425/119 |
| 3,474,496 | 10/1969 | Klee | 425/119 |
| 3,611,501 | 10/1971 | Daum et al. | 425/119 |
| 3,659,301 | 5/1972 | Auberry et al. | 12/133 R |
| 3,994,645 | 11/1976 | Funck | 425/119 |
| 4,817,305 | 4/1989 | Wetzel | 425/119 |

FOREIGN PATENT DOCUMENTS

| | | | |
|---|---|---|---|
| 1053371 | 2/1954 | France | 425/119 |
| 2130739 | 11/1972 | France | 425/119 |
| 2279538 | 2/1976 | France | 425/119 |
| 2389346 | 1/1979 | France | 425/119 |

*Primary Examiner*—Robert Davis
*Attorney, Agent, or Firm*—Collard & Roe, P.C.

[57] ABSTRACT

The invention includes a device for the manufacture of sandals. The device is formed by a last, covered by the sandal shaft which represents the upper limitation of the cavity of a mold of an injection molding tool. The molding tool is designed for molding a sole onto the shaft in an injection mold cavity, such cavity being formed by lateral parts of the mold and, if necessary, a bottom last portion. The upper edge of the lateral parts of the mold and the complementary contour of the last form a sealing zone for the cavity. In addition, there is provided within the area of the sealing zone, a seal of elastic material, disposed between the last and the lateral parts of the mold. The seal encloses the last completely when the lateral parts of the mold are in their closed position.

2 Claims, 2 Drawing Sheets

DEVICE FOR MANUFACTURING SANDALS

BACKGROUND OF THE INVENTION

1. Field of the Invention

The present invention relates to an improved device for manufacturing sandals. The device includes a last covered by the strap of the sandal. The last provides the upper limitation of a mold cavity of an injection molding tool for molding a sole onto the shaft. The cavity is formed by lateral parts of the mold and, if need be, a bottom last. The upper edges of the lateral parts of the mold with the complementary contour of the last, form a sealing zone for the cavity of the mold.

Such a device allows multi-layered, multicolored soles made of plastic and/or rubber to be directly molded onto the shaft put into the last, with one or several layers, in one or more colors. The top part of the sandal, formed by the straps, is stitched to an insole consisting of fabric or leather.

2. The Prior Art

The seal between the molded lateral parts and the shaft generally poses no problems with normal shoe shafts. However, with sandals, the area between the straps of the sandal are critical zones because the straps have a thickness ranging from 1.5 to 2.5 mm. Without additional sealing measures, sole material would exit from the mold cavity through the slits remaining between the edges of the molded side parts and the last.

Therefore, the open areas between the straps were bridged heretofore by inserting strips of textile or leather materials.

In addition to an increase in material consumption, this step has the drawback that such intermediate layers have to be inserted with each shaft by an additional work step in the areas between the straps. Following injection-molding of the sole, such intermediate layers have to be removed again, which constitutes a significant expenditure of time. The intermediate layers have to be exactly cut to fit, and provision has to be made for different measures for each sandal model of each size. This requires additional storage space to keep intermediate layers having all sorts of different dimensional sizes.

SUMMARY OF THE INVENTION

Accordingly, the present invention provides a device for manufacturing sandals, in which a last covered by the sandal top mold provides the upper limitation of a mold cavity of an injection molding tool for molding a sole onto the shaft. The cavity is formed by lateral parts of the mold and, if need be, a bottom last portions. The upper edges of the lateral mold parts with the complementary contour of the last form a sealing zone for the cavity of the mold. Located within the sealing zone is a seal, made of elastic material and the lateral mold parts. The seal completely encloses the last at least in the closed condition of the lateral mold parts.

However, in a preferred embodiment, a groove extending all around is worked into the last. Inserted into the groove is a sealing ring consisting of an elastic material, which projects outwardly beyond the contour of the last, and is arranged in a groove.

In this way, only one last is needed to create different sandal models of the same size without requiring costly preliminary work prior to each injection cycle. This additional work comes in the form of inserting additional textile or leather straps into the mold. The elasticity of the seal on the last causes the straps of the sandal shaft to follow the contour of the last within the zone of the seal. The seal is pressed into the groove, on the one hand, whereas between the straps, the seal projects beyond the outer planes of the straps. The lateral parts of the mold are driven together until the sealing edges of the lateral parts come to rest against the outer surfaces of the straps. At that point, the seal is compressed between the straps as well, and the elastic material is forced into the areas directly adjoining the straps. In this way, the mold cavity is securely sealed due to the elastic resetting forces occurring in the sealing ring, and no sole material can exit in the upward direction.

Furthermore, this type of seal permits displacing the sealing edges entirely into the range of the top edge of the sole even when the last is in place, but not immersed. This means that it is possible to produce expulsion-free sandals without using sealing bridging strips, which create undesirable uneven spots or depressions on the surface. Normal and orthopedic insoles can be inserted later without problems, a strap which is not possible when conventional methods are employed because the latter, matching foot supports have to be jointly molded during the course of manufacture, or partly underlined.

With the help of the device according to the invention, refitting work, which involves changing from one shoe size to another, can be carried out as simply and quickly as with the devices for ordinary shoes. Furthermore, the device provides an additional advantage during the manufacture of sandals by removing the steps of inserting bridging strips and, therefore any additional stockkeeping of these strips.

Preferably, the sealing ring is made of synthetic rubber which, has the required elasticity, and is also resistant to wear. Therefore, this sealing ring needs to be replaced only at greater time intervals.

Another advantage offered by the device according to the invention is that existing lasts can be fitted with the seal of the invention in a simple and quick way, and that such lasts can also be used for the manufacture of normal shoes.

Therefore, it is an object of the present invention to design a device so that there is formed a sealed mold cavity having a secure tightness in the critical zones irrespective of the sandal model and shoe size without requiring additional intermediate layers.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawings, wherein similar reference characters denote similar elements throughout the two views.

DETAILED DESCRIPTION OF PREFERRED EMBODIMENTS

Figure 1:
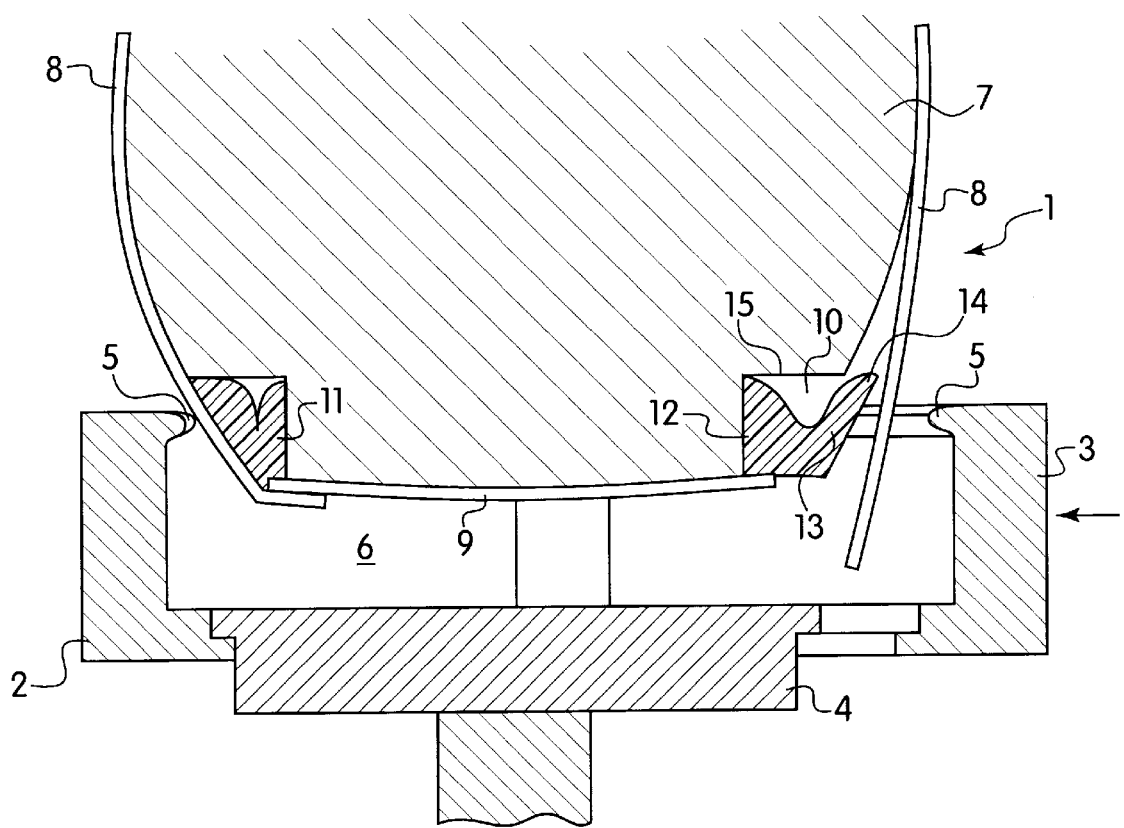
FIG. 1 is a cross-sectional view through a device for producing sandals.

Turning now in detail to the drawings, a device 1 is shown for the manufacture of sandals. In the present case, device 1 consists of two lateral mold parts 2 and 3, wherein lateral mold part 2 is shown in the closed position and lateral mold part 3 in the open position. The area between lateral mold parts 2 and 3 is closed by a vertically driven bottom last portion 4. The top edges 5 of mold parts 2 and 3 project inwardly and serve as sealing edges, which come to rest against sealing surfaces located in a last 7. Last 7 defines the upper limits of a mold cavity 6. Mold cavity 6 is thus formed by lateral mold parts 2 and 3 and bottom last portion 4. A hole sprue (not shown) feeds into mold cavity 6, and is arranged, for example in the plane of separation of the lateral parts of the mold. Sole material consisting of plastic or rubber is injected via the sprue into mold cavity 6 by means of a known injection molding unit (not shown). A sandal shaft is put on last 7, consisting of straps 8, which are schematically shown in the drawing, and a fabric insole 9, the latter being stitched to the straps.

In the right side of FIG. 1, the seam between fabric insole 9 and strap 8 is shown unraveled to illustrate the device of the invention more clearly. Within the range of last 7, a right-angled groove 10 is worked into last 7, and extending all around. A sealing ring 11 is inserted in groove 10 and extends all around as well, the ring having an approximately U-shaped cross section. One U-shaped leg 12 rests against the vertical wall of groove 10, whereas the adjacent U-shaped leg 13 (right side of FIG. 1) projects outwardly beyond the contour of the last, forming a sealing lip 14. The opening of the U-shaped seal points in the direction of the horizontal wall 15 of groove 10.

The left half of FIG. 1 shows the condition wherein lateral part 2 is in its closed position, and sealing edge 5 of lateral mold part 2 rests against the surface of strap 8. Strap 8 follows the contour of last 7, pressing the outer U-shaped leg 13 of seal 11 into groove 10. In the areas between straps 8, and last 7 sealing lip 14 on U-shaped leg 13 is forced back from sealing edge 5 of lateral mold part 2 into groove 10 only to an extent such that the slot between sealing edge 5 of lateral mold part 2 and last 7 is securely sealed by elastic seal 11.

Figure 2:
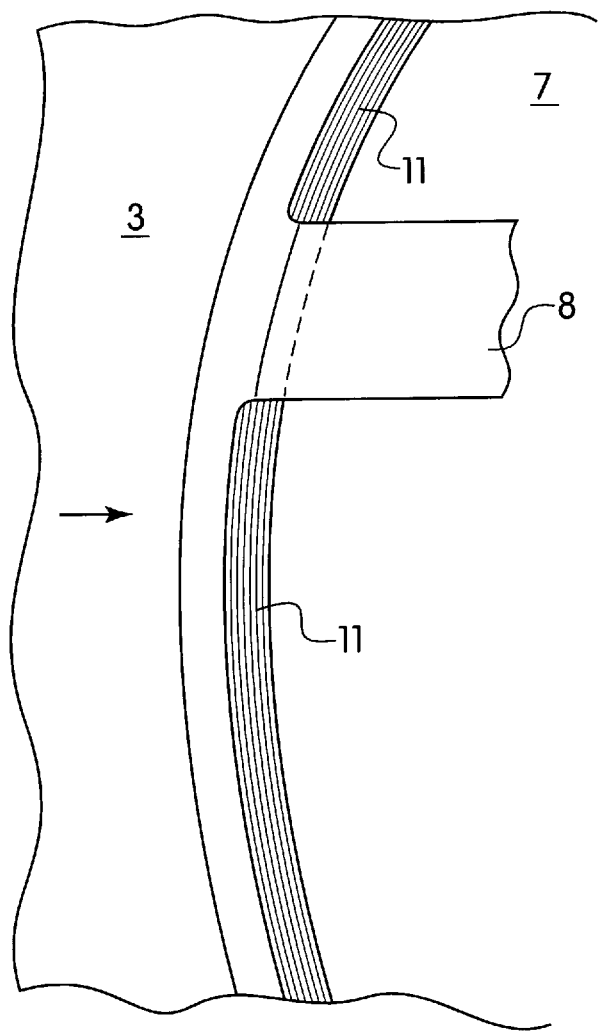
FIG. 2 is a top view of a cutout of the device of FIG. 1.

FIG. 2 shows the condition obtained on the right side of FIG. 1 when strap 8 is stitched to the insole. Here, strap 8 has depressed seal 11 completely back into groove 10, whereas in the areas between the straps 8, sealing lip 14 still projects beyond the marginal contour of last 7. Lateral mold part 3 is still in the open-position. When lateral mold part 3 is driven closed, the condition described above is obtained, as shown on the left side of FIG. 1.

While only a single embodiment of the present invention have been shown and described, it is to be understood that many changes and modifications may be made thereunto without departing from the spirit and scope of the invention as defined in the appended claims.

What is claimed is:

1. A device for manufacturing sandals, comprising:

a last for covering a sandal shaft, lateral mold parts having upper edges for enclosing lateral sides on said last when said mold parts are in a closed position;

a bottom last portion which in combination with said lateral mold parts and said last form a sealed zone;

a seal of elastic material disposed within the area of the sealed zone between said last and said lateral mold parts, and said last portion, said seal completely enclosing the last when said lateral mold parts are in a closed position; and a groove having a right angled cross-section and a vertical wall extending around said mold within the area of the sealing zone into the last, wherein said seal comprises an elastic ring disposed in said groove and having a U-shaped cross-section whereby one U-leg rests against vertical wall of the groove, the adjacent U-leg forms a sealing lip that laterally projects beyond the contour of the last in the unstressed condition, and the opening "U" points in the direction of the right angle wall of the groove.

2. The device according to claim 1, wherein said sealing ring consists of synthetic rubber.

\* \* \* \* \*

UNITED STATES PATENT AND TRADEMARK OFFICE
CERTIFICATE OF CORRECTION

PATENT NO. : 5,891,484
DATED : April 6, 1999
INVENTOR(S) : Strüssmann

It is certified that error appears in the above-indentified patent and that said Letters Patent is hereby corrected as shown below:

In the title page, column 1, line [30], change
"195 53 849.1" to --196 53 849.1--

Signed and Sealed this

Twenty-fourth Day of October, 2000

Attest:

Q. TODD DICKINSON

*Attesting Officer*          *Director of Patents and Trademarks*